United States Patent
Hejza

(10) Patent No.: US 6,577,628 B1
(45) Date of Patent: Jun. 10, 2003

(54) PROVIDING QUALITY OF SERVICE (QOS) IN A NETWORK ENVIRONMENT IN WHICH CLIENT CONNECTIONS ARE MAINTAINED FOR LIMITED PERIODS OF TIME

(75) Inventor: Leo A. Hejza, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/344,272

(22) Filed: Jun. 30, 1999

(51) Int. Cl.[7] .............................................. H04L 12/26

(52) U.S. Cl. ................... 370/392; 370/395.21

(58) Field of Search ............... 370/392, 395.2, 370/395.21, 461; 342/37

(56) References Cited

U.S. PATENT DOCUMENTS

| | | | | |
|---|---|---|---|---|
| 5,353,283 A | * | 10/1994 | Tsuchiya | 370/392 |
| 5,463,624 A | * | 10/1995 | Hogg et al. | 370/461 |
| 5,798,726 A | * | 8/1998 | Schuchman et al. | 342/37 |
| 6,408,001 B1 | * | 6/2002 | Chuah et al. | 370/392 |

* cited by examiner

Primary Examiner—Salvatore Cangialosi
(74) Attorney, Agent, or Firm—Blakely Sokoloff Taylor & Zafman

(57) ABSTRACT

A method and apparatus are provided for implementing Quality of Service (QoS) in a network environment in which client connections are maintained for limited periods of time. According to one embodiment, packet forwarding devices of a network, such as routers, bridges, and Local Area Network (LAN) switches, are caused to forward packets associated with a client according to a particular class of service, e.g., best-efforts, premium service, associated with the user of the client by assigning a network address, e.g., an Internet Protocol (IP) address, to the client based upon the particular class of service. According to another embodiment, a method of configuring the packet forwarding devices in a network is provided. For each class of service supported, information identifying one or more ranges of network addresses that are to receive a particular measure of service associated with the class of service is communicated to the packet forwarding devices. According to yet another embodiment, a network includes one or more packet forwarding devices, a network address assignment server, and a network administration terminal. The network address assignment server is configured to receive a connection request initiated by a client, to identify a particular class of service that is accessible to a user of the client, and to assign a network address corresponding to the particular class of service to the client. The network administration terminal configures the one or more packet forwarding devices to perform packet forwarding according to the classes of service supported by identifying, for each class of service, a pool of network addresses that are to receive a particular measure of service associated with the class of service. The pools of network addresses each contain one or more ranges of network addresses from a network address space allocated to the network.

23 Claims, 8 Drawing Sheets

US 6,577,628 B1

PROVIDING QUALITY OF SERVICE (QOS) IN A NETWORK ENVIRONMENT IN WHICH CLIENT CONNECTIONS ARE MAINTAINED FOR LIMITED PERIODS OF TIME

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer networking. More particularly, the invention relates to a mechanism for implementing Quality of Service (QoS) in a computer network using dynamic network address assignment.

2. Description of the Related Art

Internet Service Providers (ISPs) typically attempt to differentiate themselves based on price and/or service. Price differentiation, however, tends to be a no win game as it tends to lower margins industry wide. Therefore, future differentiation among ISPs is expected to come from the service side.

As network traffic has become more diverse and bandwidth-intensive, it has become apparent that increased network speed and bandwidth alone will not satisfy the high demands of today network environments. Consequently, much attention has been devoted to mechanisms for providing Quality of Service (QoS). For purposes of this application, "Quality of Service," "service level," "class of service," and the like, generally refer to a quantifiable measure of service being provided. The measure of service being provided may be in terms of a packet loss rate, a maximum delay, a committed minimum bandwidth, or a limited maximum bandwidth, for example.

Current mechanisms for providing Quality of Service have several limitations. An example of one current mechanism is Resource Reservation Protocol (RSVP), an Internet Protocol—(IP) based protocol that allows end-stations (clients), such as desktop computers, to request and reserve resources within and across networks. However, RSVP is an end-to-end protocol that merely defines the means of communicating a desired Quality of Service between routers. RSVP is limited in that it is receiver initiated. According to RSVP, the end-station that is receiving the data stream communicates its requirements to an adjacent router and those requirements are passed back to all intervening routers between the receiving end-station and the source of the data stream and finally to the source of the data stream itself. Therefore, it should be apparent that RSVP does not allow the user of the source end-station to express his/her desire for a particular level of service. Consequently, while some ISP customers would be willing to pay for increased levels of service, RSVP does not meet the needs of these ISP customers.

Another recent attempt to facilitate traffic differentiation and prioritization include draft standards specified by the Institute of Electrical and Electronics Engineers (IEEE). The IEEE 802.1 Q draft standard provides a packet format for an application to specify which Virtual Local Area Network (VLAN) a packet belongs to and the priority of the packet. The IEEE 802.1p committee provides a guideline to classify traffic based on a priority indicator in an 802.1Q frame tag. This allows VLANs to be grouped into eight different traffic classes or priorities. The IEEE 802.1p committee does not, however, define the mechanism to service these traffic classes.

In light of the foregoing, what is needed is a way to provide Quality of Service in an ISP's network environment. In particular, it would be desirable for the ISP to be able to offer its customers various levels of service at different price points.

BRIEF SUMMARY OF THE INVENTION

A method and apparatus are described for providing Quality of Service (QoS) in a network environment in which client connections are maintained for limited periods of time. According to one embodiment, packet forwarding devices of a network are caused to forward packets associated with a client according to a particular class of service associated with the user of the client by assigning a network address to the client based upon the particular class of service.

According to another embodiment, a method of configuring the packet forwarding devices in a network is provided. For each class of service supported, information identifying one or more ranges of network addresses that are to receive a particular measure of service associated with the class of service is communicated to the packet forwarding devices.

Advantageously, by employing various aspects of the present invention an ISP may subdivide its network address space into multiple priority pools, where each priority pool represents a range of network addresses that are to receive a particular level of service. Separately, the ISP may also maintain a mapping of each of its users to one of several different service levels. In this manner, the ISP may dynamically allocate network addresses to clients requesting a connection to the network by selecting an available network address from the appropriate priority pool that corresponds to the service level associated with the user.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
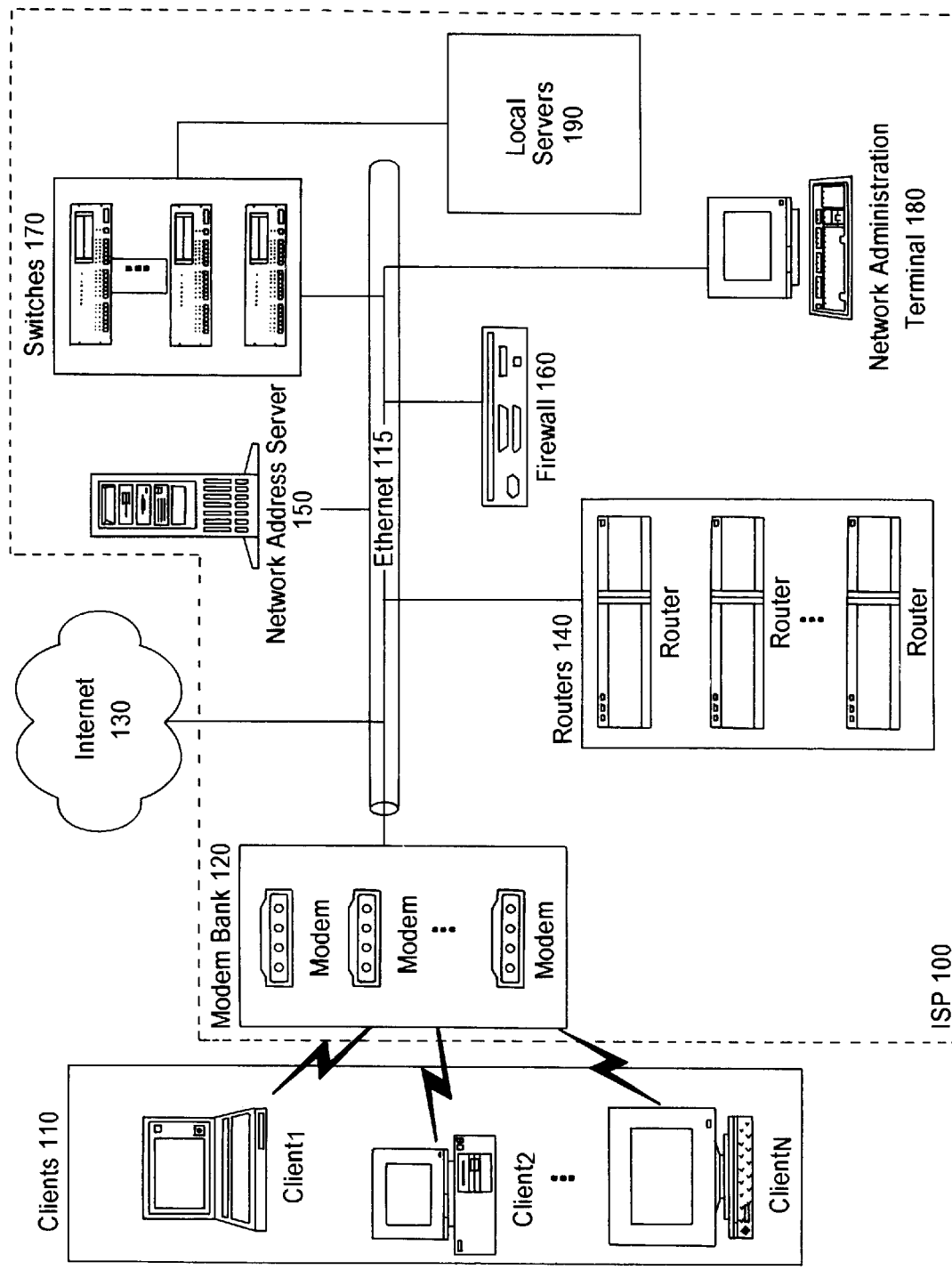
FIG. 1 conceptually illustrates an exemplary network architecture according to one embodiment of the present invention.

A method and apparatus are described for providing Quality of Service (QoS) in a network environment in which client connections are maintained for limited periods of time. Broadly stated, by employing various embodiments of the present invention, Internet Service Providers (ISPs) can provide their users with various levels of service. According to one aspect of the present invention, packet forwarding devices within the ISP's firewall may be configured to expedite the handling of packets associated with one or more ranges of network addresses. Subsequently, when users of the network request a connection, they are dynamically assigned a network address based upon a service level associated with their account. Advantageously, in this manner, ISPs can offer increased service to those of its users willing to pay.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Importantly, while embodiments of the present invention will be described with reference to improvements to the Dynamic Host Configuration Protocol (DHCP), the method and apparatus described herein are equally applicable to other types of dynamic network address assignment protocols and can be employed, for example, in networks using SLIP and PPP. Additionally, for convenience, embodiments of the present invention are described with respect to QoS-capable network devices that support three service levels: (1) high priority, (2) medium priority, and (3) low priority; however, the method and apparatus described herein are equally applicable to QoS-capable network devices that implement fewer service levels, e.g., (1) best-effort, and (2) premium service, and/or additional service levels. Furthermore, while dynamic network address assignment is emphasized in this application, it is appreciated that the method and apparatus described herein also provide benefits when static network addresses are employed by network providers. Moreover, while embodiments of the present invention will be described with reference to a network in which client connections are maintained for limited periods of time, such as dial-up networks accessible to users directly by means of direct-dial telephone, the method and apparatus described herein are broadly applicable to networks that are directly accessible by users by means other than direct-dial telephone. For example, it is contemplated that various aspects of the present invention will provide benefit in connection with networks accessible by way of a cable modem, satellite communications channels, cellular communications, and various other connection-oriented network environments with transient client connections. Finally, for convenience, embodiments of the present invention are described with respect to traffic using the Internet suite of protocols, e.g., Transmission Control Protocol/Internet Protocol (TCP/IP) over Ethernet Local Area Network (LAN) standard and medium access control (MAC) data link layer; however, the method and apparatus described herein are equally applicable to networks and devices employing other network addressing schemes and network layer protocols, such as Internetwork Packet Exchange (IPX).

An Exemplary Network Architecture

Various aspects of the present invention are particularly useful in connection with achieving Quality of Service (QoS) in a network environment in which client connections are maintained for limited periods of time, such as that conventionally employed by Internet Service Providers (ISPs). Therefore, to put the present invention in context, it may be helpful to describe an exemplary network architecture according to one embodiment of the present invention.

A user of a client computer system generally accesses an ISP via a direct-dial telephone (POTS, for "plain old telephone service"), ISDN (Integrated Services Digital Network), or other similar connection, in order to browse the World-Wide Web, send and receive e-mail, access chat areas and news groups, and use various other network services provided by the ISP. Services furnished by the ISP are typically provided by local servers using software residing within the servers.

Referring to FIG. 1, a group of clients 110 are depicted interacting with an ISP 100. In this example, the ISP 100 includes a modem pool 120, one or more routers 140, a network address server 150, a firewall 160, one or more switches 170, a network administration terminal 180, and one or more local servers 190. One or more clients 110 may be coupled to the modem pool 120 via a direct-dial, bi-directional communications link, which may be telephone, ISDN, or any other similar type of connection. For example, other connection mechanisms may be employed such as cable, satellite forward channels, and cellular networks. In any event, the modem pool 120 is typically coupled through one or more routers 140, such as that conventionally known in the art, via a conventional network infrastructure 115, such as Ethernet, to the Internet 130, and optionally through a firewall 160, and one or more intermediate switches 170, to a number of local servers 190. Importantly, the packet forwarding devices, e.g., the switches 170 and routers 140, of the ISP 100 should be QoS-enabled network devices. That is, they should be able to distinguish among various types of traffic and give higher or lower priority to packets defined by one or more criteria. As will be discussed further below, according to various embodiments of the present invention, a dynamically allocated network address may be used for traffic differentiation. Consequently, in this manner, packet traffic originating from and/or destined for a client receiving the dynamically allocated network address may be prioritized based upon a class of service associated with a network address range in which the client's dynamically allocated network address is included.

In alternative embodiments, other means of traffic differentiation may be employed. The information used to distinguish among various types of traffic may vary depending upon the network administrator's QoS policy. If the QoS policy is based on applications, traffic may be differentiated at the Transport layer by Transmission Control Protocol (TCP) session or User Datagram Protocol (UDP) session using TCP source and destination ports and IP source and destination addresses. Alternatively, if the QoS policy is based upon the Network layer topology traffic differentiation may be in terms of the Network layer protocol, such as IP or Internetwork Packet Exchange (IPX), the subnet or IP addresses, or VLAN identifiers. Finally, if the QoS policy is defined by client-side applications, then Media Access Control (MAC) addresses, IEEE 802.1p priority indications, or IEEE 802.1Q frames may be employed to distinguish among various types of traffic.

The network address server 150 includes a mechanism for allocating network addresses to clients 110 (hosts). Briefly, three exemplary techniques for network address allocation include: (1) automatic allocation, (2) dynamic allocation, and (3) manual allocation. In automatic allocation, the network address server 150 assigns a permanent network address (e.g., IP address) to a client. Dynamic allocation involves the network address server 150 assigning a network address to a client for a limited period of time or until the client explicitly relinquishes the address. In manual allocation, a network administrator assigns a network address to the client, and a protocol useful for dynamic network address assignment, such as Dynamic Host Configuration Protocol (DHCP), may be used simply to convey the manually assigned address to the client. Depending upon the policies of the network administrator, one or more of these mechanisms is typically employed for allocating network addresses.

Importantly, dynamic allocation allows reuse of a network address that is no longer needed by the previous client to which it was assigned. Therefore, this particular method of allocating network addresses is particularly useful for assigning network addresses to clients of an ISP and other network environments in which clients will be connected for only limited periods of time.

Preferably, as discussed further below, the packet forwarding devices include forwarding databases that are able to aggregate ranges of network addresses, for example, in one forwarding database entry, thereby allowing the same forwarding behavior to be applied to one or more types of traffic identified by the range of network addresses. According to an embodiment described below, a forwarding database provides entry aggregation by including one or more Content Addressable Memories (CAMs) with the ability to wildcard.

Regardless of the packet forwarding devices' forwarding database implementation, another important feature of the packet forwarding devices is the ability to be configured, automatically or manually by the network administrator via the network administration terminal 180, for example, to forward packets associated with a particular network address range according to rules associated with a particular service level, e.g., best-effort or premium service.

An Exemplary Computer System

Figure 2:
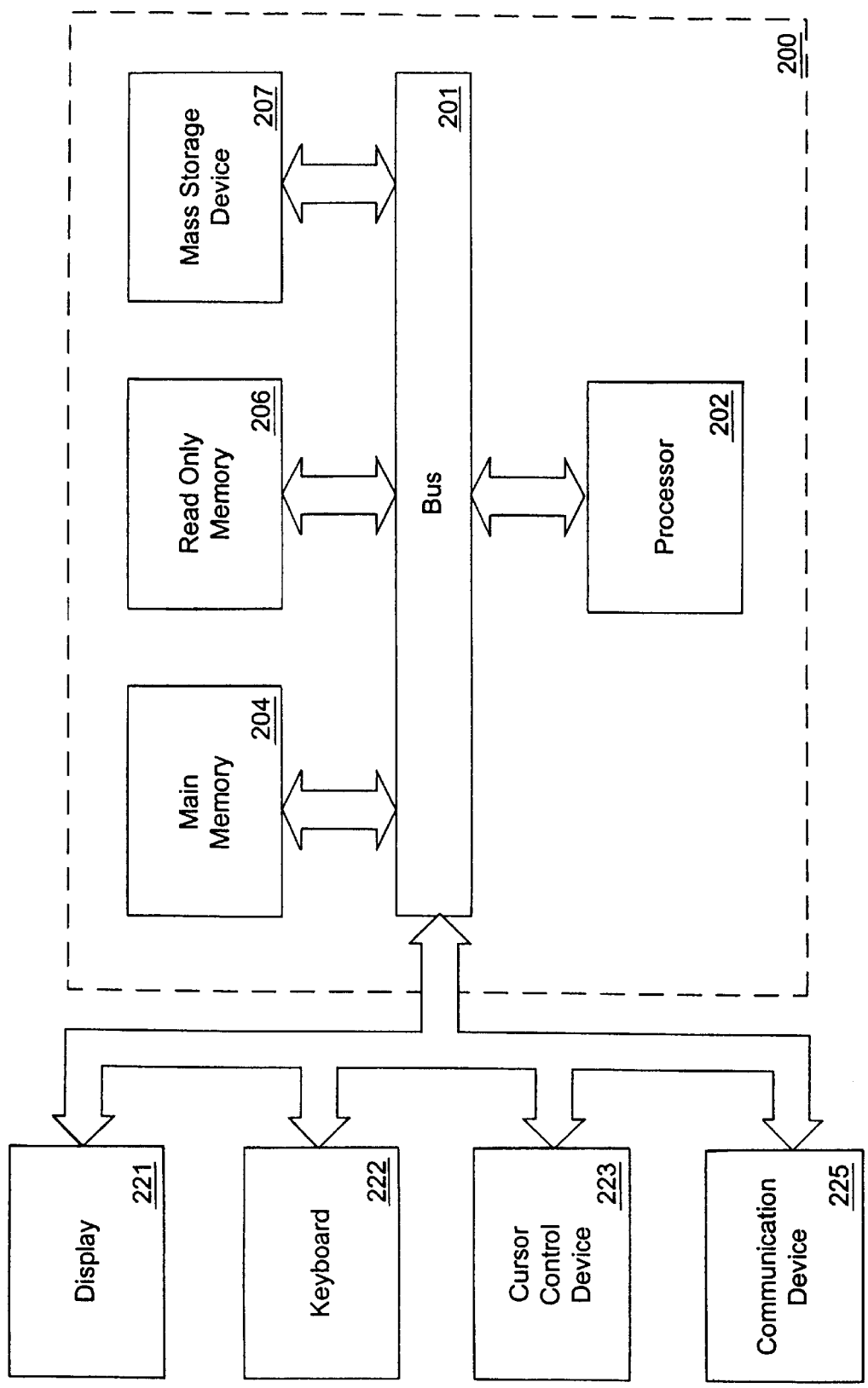
FIG. 2 is an example of a computer system upon which one embodiment of the present invention may be implemented.

Having briefly described the context in which the present invention may be employed, an exemplary machine in the form of a computer system 200 in which features of the present invention may be implemented will now be described with reference to FIG. 2. Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to a computer user.

Typically, an alphanumeric input device 222, including alphanumeric and other keys, is coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201 for providing access from/to clients/servers via the Internet, for example. The communication device 225 may include a modem, a network interface card, or other well known interface devices, such as those used for coupling to Ethernet, token ring, or other types of networks. In any event, in this manner, the computer system 200 may be coupled to a number of clients/servers via a conventional network infrastructure, such as an enterprise's Intranet (e.g., WAN) and/or the Internet, for example.

According to various embodiments of the present invention, the network address server 150 and/or the network administration terminal 180 may comprise a computer system, such as computer system 200. Therefore, embodiments of the present invention relate to the use of computer system 200 to execute one or more software programs within main memory 204 to cause a network's QoS policy to be implemented by (1) configuring one or more packet forwarding devices of a network to perform packet forwarding according to a plurality of classes of service by identifying, for each class of service, one or more ranges of network addresses that are to receive a particular measure of service associated with the class of service; and (2) identifying classes of service associated with clients requesting connections to the network and allocating network addresses to the clients based upon their identified class of service. It is appreciated that a lesser or more equipped computer system than the example described above may be desirable for certain implementations. Therefore, the configuration of computer system 200 will vary from implementation to implementation depending upon numerous factors, such as price constraints, performance requirements, technological improvements, and/or other circumstances.

High-Level Dynamic Address Assignment Processing

Figure 3:
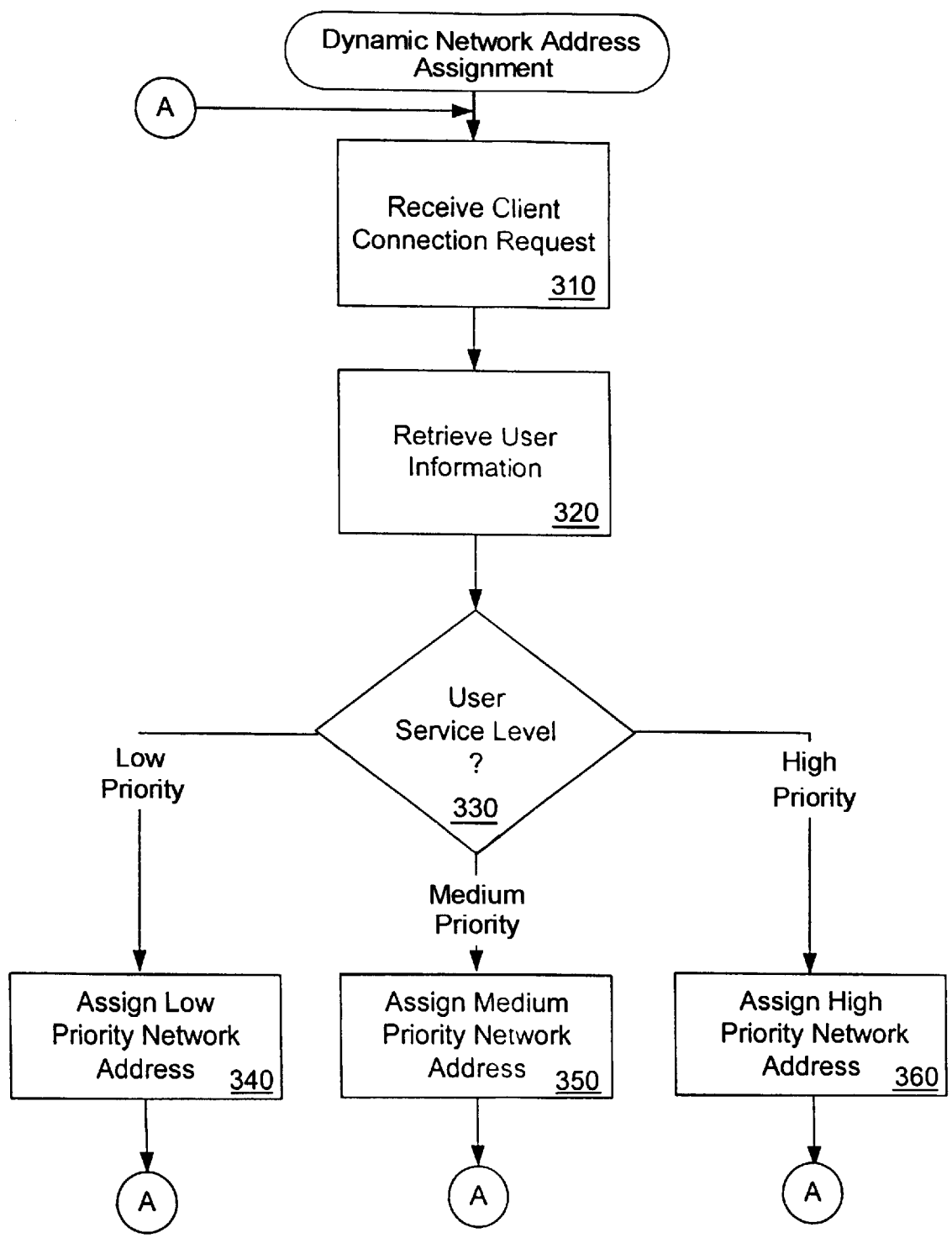
FIG. 3 is a high-level flow diagram that conceptually illustrates dynamic network address assignment processing according to one embodiment of the present invention.

FIG. 3 is a high-level flow diagram that conceptually illustrates dynamic network address assignment processing according to one embodiment of the present invention. According to the present example, a network address is dynamically assigned to a client based upon a service level associated with the user. Features of this embodiment are thought to be particularly useful to ISPs, such as American Online, Prodigy, CompuServe, etc., as they allow variable levels of service to be offered (potentially in connection with a rate structure commensurate with the level of service provided).

In one embodiment, the steps described below may be performed under the control of a programmed processor, such as processor 202, in a network address server. However, in alternative embodiments, the steps may be fully or partially implemented by any programmable or hard-coded logic, such as Field Programmable Gate Arrays (FPGAs), TTL logic, or Application Specific Integrated Circuits (ASICs), for example.

In this example, a dynamic allocation mechanism is employed to assign a network address to a client for a limited period of time. At step 310, a client connection request is received by the ISP, at network address server 150, for example. Various protocols may be used to communicate client requests and server responses, such as Dynamic Host Configuration Protocol (DHCP), PPP, SLIP, or the like. Exemplary hand shaking and other server-side processing that may occur during the client connection process is described further below.

At step 320, user information may be retrieved from a local user account database, for example, based upon user identification information. The user identification information, e.g., a unique account name, email address, hardware address, or other identifying information, may be provided during the connection process, in the client connection request, for example, or some other client originated message. In any event, the user identification information may be used in connection with a database query to retrieve information about the user from the local user account database. Preferably, the local user account database includes the users' account status, e.g., current, expired, etc., and a service level to which the user is entitled. However, it is contemplated that the service level may be dynamically determined based upon other information, such as length of membership, a measure of service payment reliability, credits/points earned during certain promotions, availability/unavailability of one or more service levels.

At step 330, the service level of the user requesting the connection is determined. Again, service level may be directly available as a field in the local user account database, for example, or it may be dynamically determined based on other factors. For example, after three years of membership in good standing with an ISP, the user might be rewarded with a higher service level. At any rate, in this example, depending on the service level, a low, medium, or high priority network address is assigned to the client at step 340, 350, or 360, respectively. In this manner, packet forwarding devices (configured as described below) forward packet traffic from a client having a low priority address according to the forwarding rules associated with the low priority service level. Similarly, the packet forwarding devices will forward packet traffic from a client having a medium or high priority address according to the forwarding rules associated with the medium or high priority service level, respectively.

While the description above focuses upon dynamic allocation, it is appreciated that network administrators may employ manual allocation techniques to accomplish similar results. Therefore, various embodiments of the present invention are intended to include both manual and dynamic allocation of network addresses.

Dividing the Available Network Addresses into Priority Pools

Various methods for dividing the ISPs network address space and tracking the availability status of the network addresses may be employed. For example, a number of priority pools of contiguous network addresses can be defined and marked as "in use" or "available" as they are allocated and deallocated, respectively. Alternatively, available and used lists may be employed.

Figure 4B:
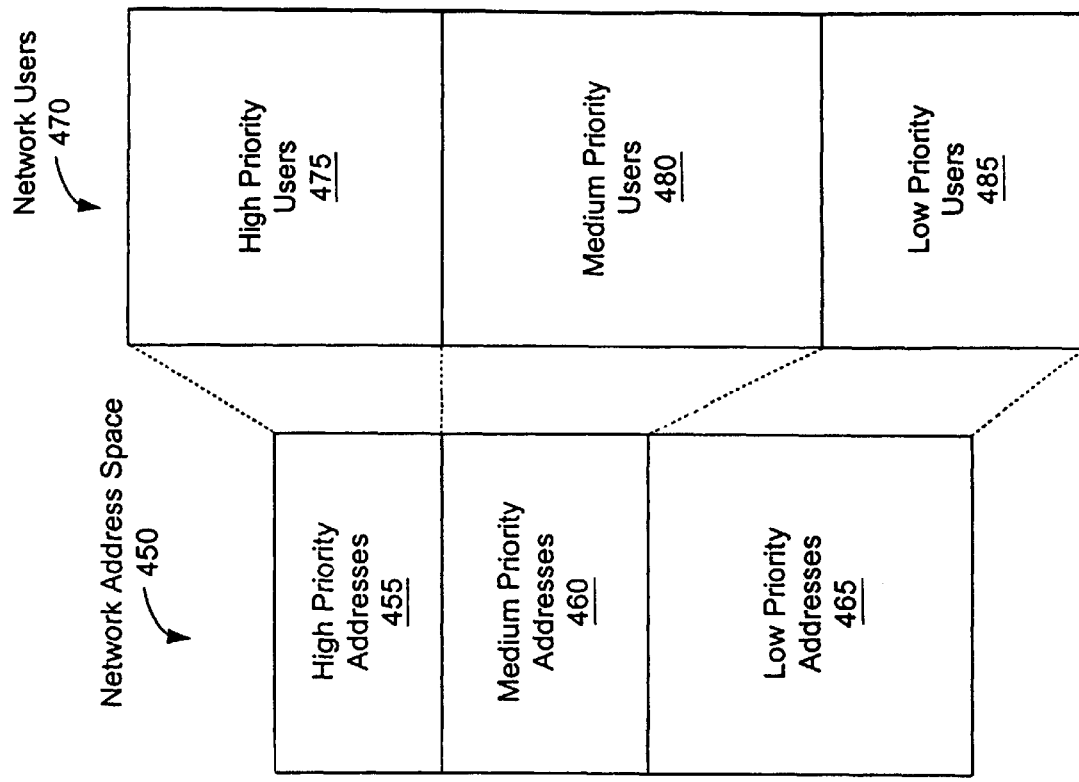
FIG. 4B conceptually illustrates an initial allocation of network addresses for situations in which the users of at least one class of service exceed the number of network addresses available for that class of service.
Figure 4A:
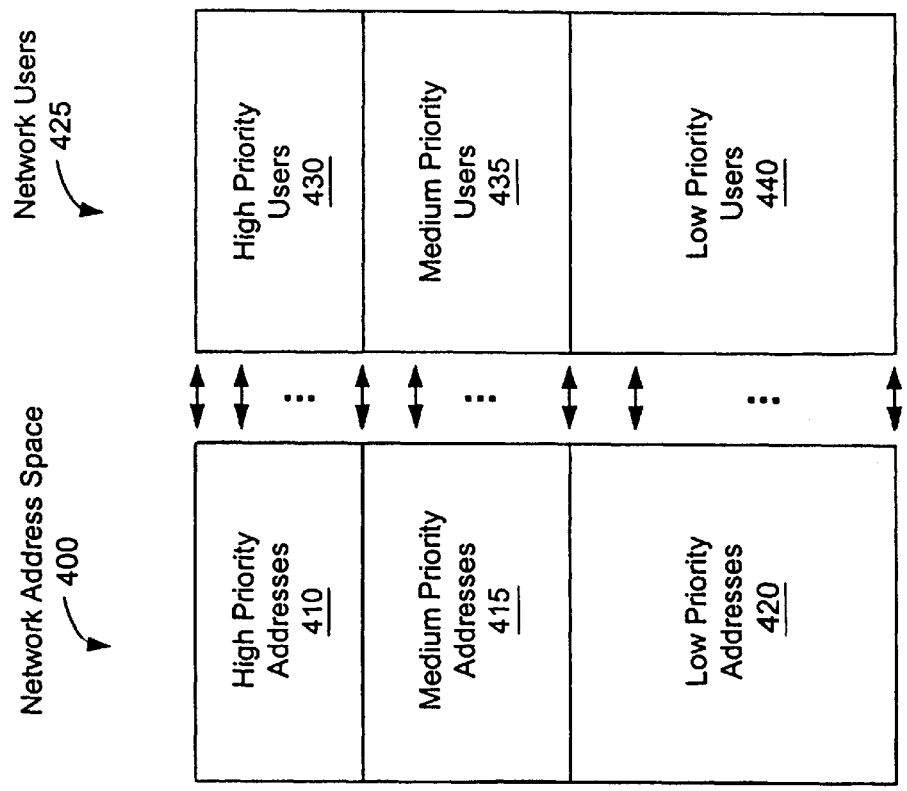
FIG. 4A conceptually illustrates a simple way of dividing a network address space to accommodate all possible users for each class of service.

FIG. 4A conceptually illustrates a simple way of dividing a network address space 400 to accommodate all possible users for each class of service 425. In this example, the ISP may simply provide enough network addresses for all of its users. The network address space can then be divided into priority pools 410, 415, and 420. The boundaries separating the priority pools 410, 415, and 420 may be determined according to the number of classes of service offered by the ISP and the demand for each class of service. Preferably, the priority pools 410, 415, and 420 comprise one or more blocks of contiguous network addresses to take advantage of the wild-carded matches provided by the forwarding database implementation described below. Finally, the ISP may simply pre-assign each user a network address from the priority pool corresponding to their desired service level.

Of course, acquiring network addresses for each user may be impractical, therefore, in another embodiment, network addresses need only be available for a subset of the users as determined by projected usage statistics, for example, and the available network addresses for the priority pools may be reused as users connect and disconnect from the ISP's network. FIG. 4B conceptually illustrates an initial allocation of network addresses for situations in which the users of at least one class of service exceed the number of network addresses available for that class of service. In this example, high priority users 475, medium priority users 480, and low priority users 485 will share high priority addresses 455, medium priority addresses 460, and the low priority addresses 465, respectively. Assuming that at no time the number of connected users for a particular class of service exceeds the number of network addresses available for that class of service, the available network addresses may be reused; otherwise connection requests received for a particular class of service after the last available network address for that class of service has been allocated should be refused.

Expansion and Contraction of the Priority Pools

As described above, the simplest way to subdivide the network address space is to provide a one-to-one mapping of users to network addresses in the appropriate priority pool. However, if fewer network addresses are available than users, then network addresses may be serially reassigned to different clients within each priority pool. An initial allocation among the priority pools may be determined based upon average observed usage statistics. As usage conditions change, and users migrate to particular service levels, the priority pools can be manually or automatically subdivided as necessary. For example, the dividing lines separating the various classes of service may be changed over time to reflect shifts in usage patterns. The network administration terminal 180 may be used to manually initialize and/or change the priority pool ranges in the network address server 150.

In one embodiment, network addresses that become free as a result of shifts in usage patterns can be periodically consolidated and reallocated to one or more other priority pools which have a need for more addresses.

In another embodiment, a time-sharing mechanism may be employed in which the same address may serve as one class of service at one point in the day and as another class of service at a different time of day.

Exemplary Client-Server Message Exchange

Figure 5:
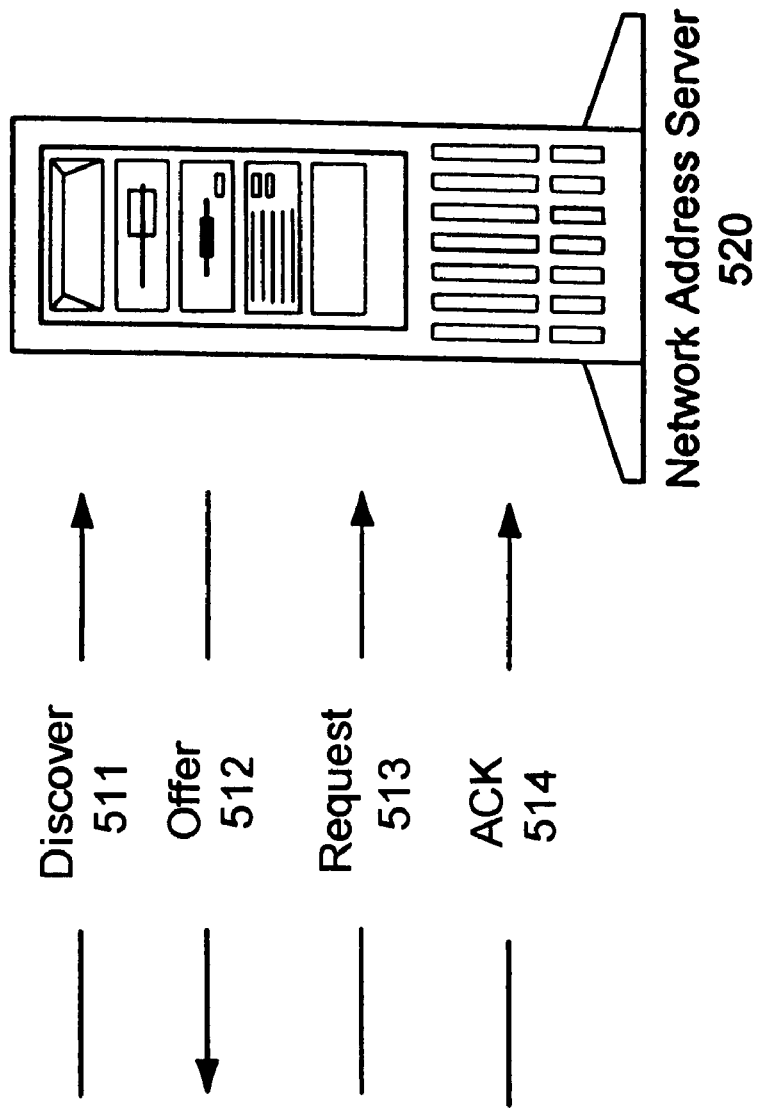
FIG. 5 is a diagram illustrating exemplary hand shaking that may occur during a client-server exchange according to one embodiment of the present invention.

FIG. 5 is a diagram illustrating client-server interaction according to one embodiment of the present invention. Since this example follows the DHCP model, only a brief description of the messages and their function will be presented here.

After establishing communications with the ISP's network, a client 510 broadcasts a discover message 511 on its local physical subnet seeking a response from a network address server 520, such as a DHCP server. More than one network address server 520 may be present in the ISP's network, in which case, each network address server 520 may respond by broadcasting an offer message 512 communicating an available network address to the client 510. Because there is the chance that the client 510 will accept a network address offered by another network address server, the network address server 520 does not need to reserve the offered network address. However, the protocol is thought to operate more efficiently if the network address server 520 temporarily treats offered network addresses as being in use and offers different network addresses in response to subsequent discover messages 511.

The client 510, after receiving one or more offers 512, may select a server to reply to and broadcast a request message 513. In response to the request message 513, the network address server 520 may broadcast an ACK message 514 to the client 510. These and other messages that may be exchanged between client and server during client connection are described in R. Droms, "Dynamic Host Configuration Protocol", RFC 2131, Network Working Group, March 1997, which is hereby incorporated by reference.

Various other automatic network address assignment techniques/protocols may be employed. For example, in alternative embodiments, modifications to one of the following automatic IP address assignment mechanisms may be employed rather than DHCP: Morgan, R., "Dynamic IP Address Assignment for Ethernet Attached Hosts", Work in Progress; Jeffrey Schiller and Mark Rosenstein, "A Protocol for the Dynamic Assignment of IP Addresses for use on an Ethernet. (Available from the Athena project at MIT), 1989.

Lower-Level Dynamic Address Assignment Processing

Figure 6:
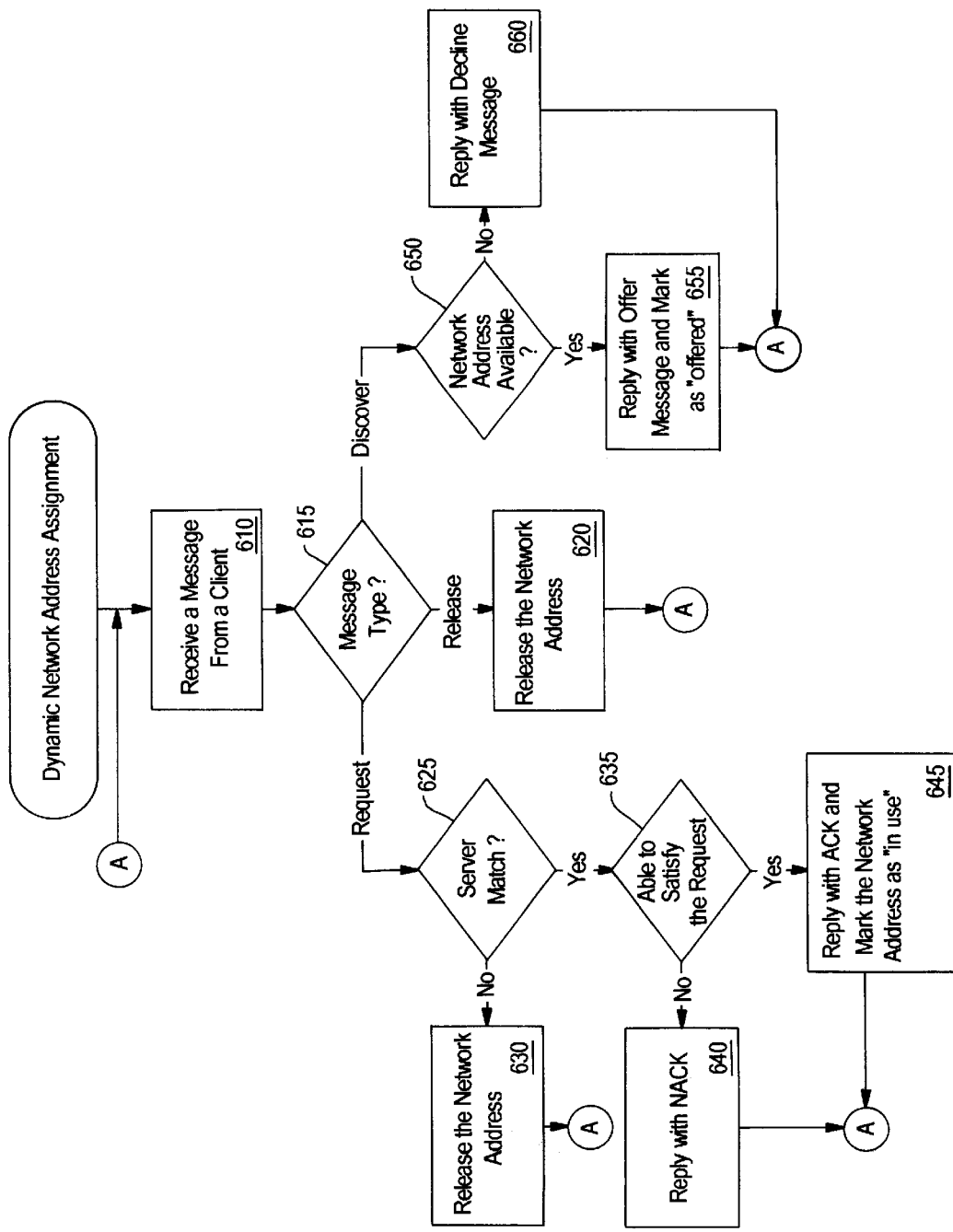
FIG. 6 is a flow diagram illustrating dynamic network address allocation processing according to one embodiment of the present invention.

FIG. 6 is a flow diagram illustrating dynamic network address assignment processing according to one embodiment of the present invention. In the embodiment depicted, at step 610, a message is received from a client. At step 615, the type of message is determined. If the message is a request message, processing continues with step 625. If the message is a release message, processing proceeds to step 620. Otherwise, if the message is a discover message, processing branches to step 650.

At step 650, the network address server 520 makes a determination whether or not a network address is available in the appropriate priority pool based upon the class of service associated with the user. If an appropriate network address is available, at step 655, the network address server 520 responds with an offer message and marks the network address as offered. Otherwise, if an appropriate network address in not available, at step 660, the network address server 520 responds with a decline message.

At step 625, the network address server 520 may determine if the request is directed to it by examining the server id in the message, for example. If the request message is not directed to the network address server 520, but to another server, the client has implicitly rejected the network address server's offer. Consequently, at step 630, the network address offered is released by marking it as available. If, however, the request message is directed to the network address server 520, as determined in step 625, then processing continues with step 635. At step 635, the network address server 520 may determine if it is able to satisfy the request. If so, processing continues with step 645; otherwise processing continues with step 640. At step 645, the network address server 520 replies to the request with an acknowledgement (ACK) message confirming its ability to satisfy the request and that the client may use the offered address. Additionally, the network address server 520 marks the offered network address as "in use." At step 650, the network address server 520 replies to the request with a negative acknowledgement (NACK) message indicating it is unable to satisfy the request and that the client may not use the offered address.

Network Configuration

Figure 7:
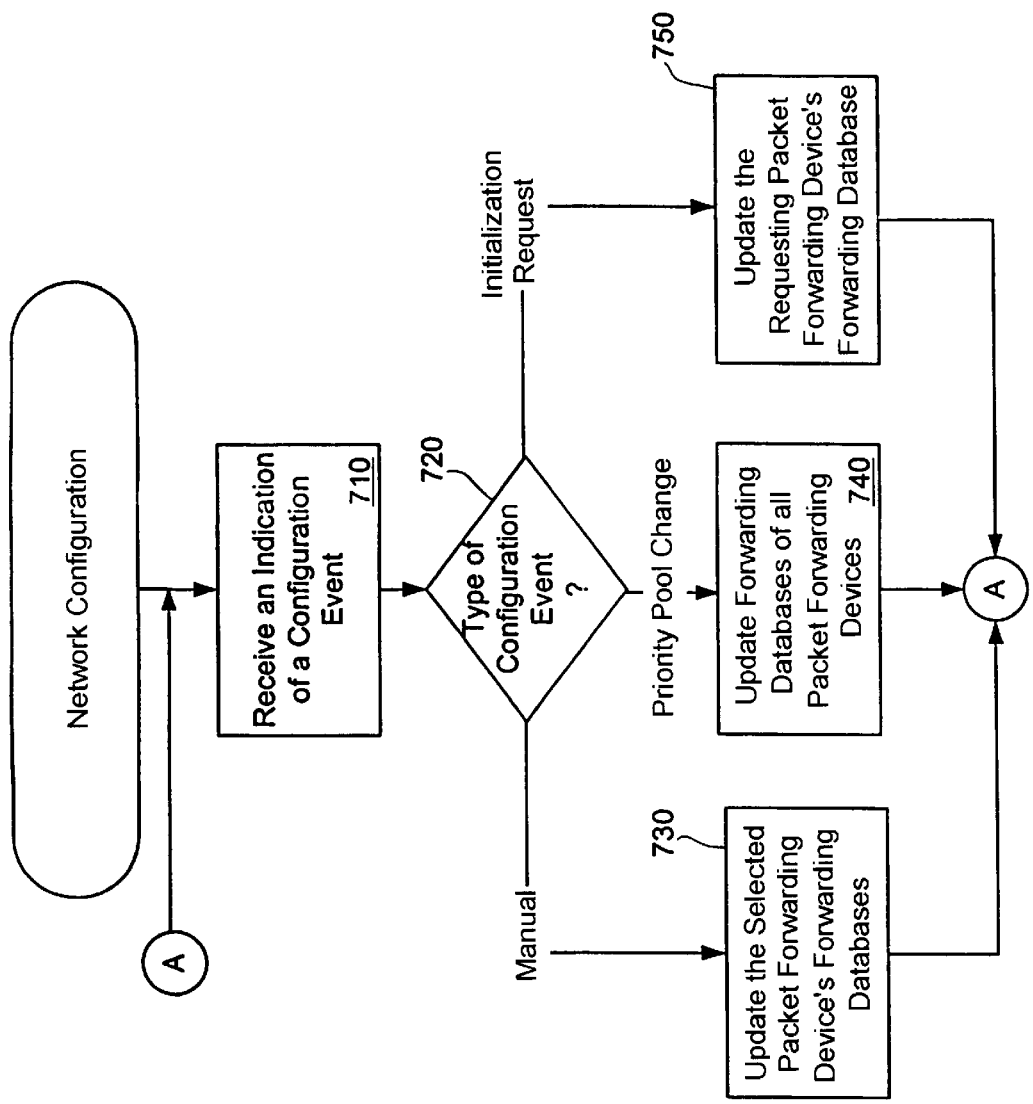
FIG. 7 is a flow diagram illustrating network configuration processing according to one embodiment of the present invention.

FIG. 7 is a flow diagram illustrating network configuration processing according to one embodiment of the present invention. According to this example, at step 710, an indication of a configuration event is received by an automated configuration process residing on the network administration terminal 180 or the network address server 150, for example. The type of configuration event is determined at step 720.

If the configuration event is a forwarding database initialization request by a packet forwarding device, then the requesting packet forwarding device's forwarding database is updated. According to one embodiment, the update is accomplished by the network administration terminal 180 causing the network address server 150 to transmit to the requesting packet forwarding device an indication, for each class of service supported, the range(s) of network addresses that are to receive the particular measure of service associated with the class of service.

If the configuration event is a manual configuration request by the network administrator, for example, then one or more packet forwarding devices' forwarding databases are updated. According to one embodiment, the updates are accomplished by the network administration terminal 180 causing the network address server 150 to transmit to the one or more packet forwarding devices an indication, for each class of service supported, the range(s) of network addresses that are to receive the particular measure of service associated with the class of service.

Similarly, if the configuration event is a priority pool change as a result of a manual or automatic reallocation of network addresses among the priority pools, for example, then the packet forwarding devices' forwarding databases are updated. According to one embodiment, the updates are accomplished by the network administration terminal 180 causing the network address server 150 to transmit to the packet forwarding devices an indication, for each class of service supported, the range(s) of network addresses that are to receive the particular measure of service associated with the class of service.

Exemplary Forwarding Database

Figure 8:
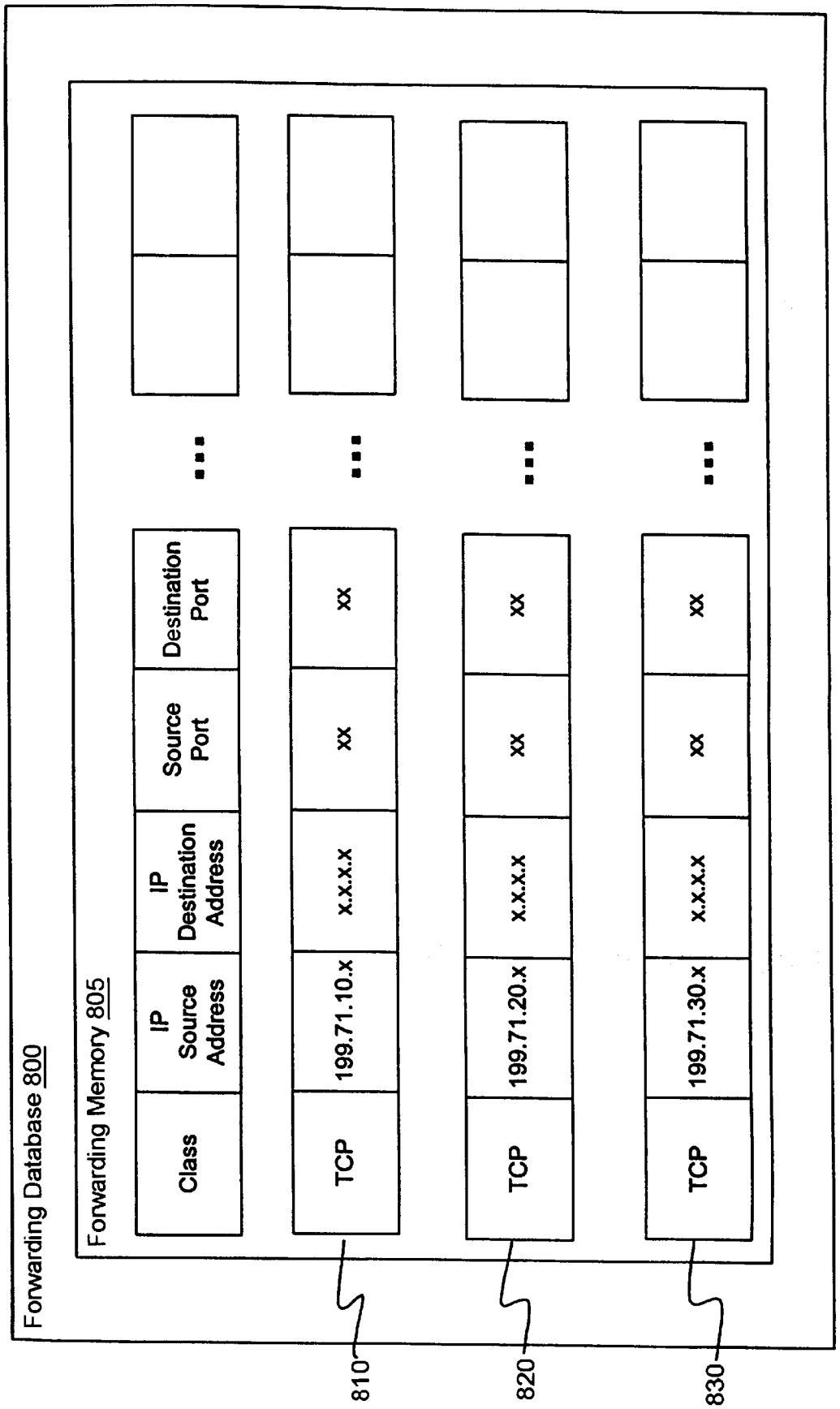
FIG. 8 illustrates an exemplary forwarding database of a packet forwarding device according to one embodiment of the present invention.

FIG. 8 illustrates an exemplary forwarding database 800 of a packet forwarding device according to one embodiment of the present invention. According to this example, the forwarding database includes a forwarding memory 805, preferably implemented as a mask-per-bit CAM. Additionally, in this example, wildcards, e.g., X's, may be used so that one or more of the fields in an entry contain "don't care" bits that will match all combinations. Exemplary entries 810, 820, and 830 which contain certain wildcarded fields may correspond to the high priority class of service, the medium priority class of service, and the low priority class of service, respectively. Therefore, packets originated at clients assigned IP addresses in the range 199.71.10.0 through 199.71.10.255 will be forwarded by the packet forwarding device according to the forwarding rules associated with the high priority class of service. Packets originated at clients assigned IP addresses in the range 199.71.20.0 through 199.71.20.255 will be forwarded by the packet forwarding device according to the forwarding rules associated with the medium priority class of service. Finally, packets originated at clients assigned IP addresses in the range 199.71.30.0 through 199.71.30.255 will be forwarded by the packet forwarding device according to the forwarding rules associated with the low priority class of service.

According to another embodiment, additional entries may be added to the forwarding memory to define the behavior to be associated with packets destined for a particular client. For example, entries similar to 810, 820, and 830 may be created with x.x.x.x in the IP source address field and the appropriate wildcarded address range in the IP destination address field.

Further description of a forwarding database with such wildcard matching capabilities in the form of a Content-Addressable Memory (CAM) forwarding memory and a Random Access Memory (RAM) associated memory is disclosed in a copending U.S. patent application entitled "MANAGEMENT OF ENTRIES IN A NETWORK ELEMENT FORWARDING MEMORY," application Ser. No. 08/884,946, filed on Jun. 30, 1997, which is assigned to the assignee of the present invention which is hereby incorporated by reference.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing Quality of Service (QoS) for users of a network in which client connections are maintained for limited periods of time, the method comprising the step of assigning a network address to a client according to a particular class of service associated with the user of the client, and forwarding packets associated with the client according to priority associated with the assigned network address.

2. The method of claim 1, further comprising the step of receiving a connection request initiated by a client.

3. The method of claim 2, wherein the connection request includes user identification information, and wherein the method further comprises the step of determining the particular class of service of a plurality of classes of service based upon the user identification information.

4. The method of claim 1, wherein the particular class of service is associated with a pool of network addresses.

5. The method of claim 4, wherein the pool of network addresses includes fewer network addresses than users having access to the particular class of service, and wherein the step of assigning comprises allocating a reusable network address to the client.

6. The method of claim 4, wherein the pool of network addresses includes a number of network addresses greater than or equal to the number of users having access to the particular class of service, and wherein the step of assigning comprises providing a network address that has been pre-assigned to the client.

7. The method of claim 1, wherein the network address comprises a static network address, and wherein the method further comprises the step of receiving the static network address from connection software running on the client.

8. The method of claim 1, further including the step of exchanging one or more dynamic network address assignment protocol messages with the client.

9. The method of claim 8, wherein the dynamic network address assignment protocol comprises Dynamic Host Configuration Protocol (DHCP), and wherein the step of exchanging one or more dynamic network address assignment protocol messages with the client comprises exchanging one or more DHCP messages with the client.

10. The method of claim 1, wherein the network address is an IP address.

11. A method of providing Quality of Service (QoS) for users of a network in which client connections are maintained for limited periods of time, the method comprising the steps of:

receiving a connection request initiated by a client, the connection request including user identification information;

identifying which of a plurality of classes of service is accessible to the user based upon the user identification information;

assigning a network address to a client from a priority pool of network addresses according to a particular class of service associated with the client; and forwarding packets associated with the client according to priority associated with the assigned network address.

12. The method of claim 11, wherein the network address is an IP address.

13. The method of claim 11, wherein the priority pool of network addresses includes fewer network addresses than users having access to the identified class of service, and wherein the step of assigning comprises allocating a reusable network address to the client.

14. The method of claim 11, wherein the priority pool of network addresses includes a number of network addresses greater than or equal to the number of users having access to the identified class of service, and wherein the step of assigning comprises allocating a reusable network address to the client.

15. The method of claim 11, further including the step of exchanging one or more dynamic network address assignment protocol messages with the client.

16. The method of claim 15, wherein the dynamic network address assignment protocol comprises Dynamic Host Configuration Protocol (DHCP), and wherein the step of exchanging one or more dynamic network address assignment protocol messages with the client comprises exchanging one or more DHCP messages with the client.

17. A method of providing Quality of Service (QoS) for users of a network in which client connections are maintained for limited periods of time, the method comprising the step of configuring one or more packet forwarding devices of the network to perform packet forwarding according to a plurality of classes of service by identifying, for each class of service of the plurality of classes of service, a pool of network addresses that are to receive a particular measure of service associated with the class of service, each pool of network addresses comprising one or more ranges of network addresses from a network address space allocated to the network.

18. The method of claim 17, wherein the network address is an IP address.

19. The method of claim 17, further comprising the steps of:
- receiving a connection request initiated by a client, the connection request including user identification information;
- identifying which of the plurality of classes of service is accessible to the user based upon the user identification information; and
- assigning a network address to the client from one of the plurality of priority pools based upon the identified class of service.

20. A network address assignment server comprising:
- a storage device having stored therein one or more routines for communicating with clients of a network in which client connections are maintained for limited periods of time; and
- a processor coupled to the storage device for executing the one or more routines to receive a connection request initiated by a client, identify a particular class of service that is accessible to a user of the client, and cause one or more packet forwarding devices of the network to forward packets associated with the client according to the particular class of service, where:
  - the connection request includes user identification information;
  - the particular class of service is identified from among a plurality of classes of service based upon the user identification information; and
  - the one or more packet forwarding devices of the network are caused to forward packets associated with the client according to the particular class of service by assigning a network address to the client from a pool of network addresses corresponding to the particular class of service.

21. The network address assignment server of claim 20, wherein the network address is an IP address.

22. A network comprising:
- a communications medium;
- one or more packet forwarding devices coupled to the communications medium;
- a network address assignment server coupled to the communications medium to receive a connection request initiated by a client, to identify a particular class of service of a plurality of classes of service that is accessible to a user of the client, and to assign a network address corresponding to the particular class of service to the client; and
- a network administration terminal coupled to the communications medium to configure the one or more packet forwarding devices to perform packet forwarding according to the plurality of classes of service by identifying, for each class of service of the plurality of classes of service, a pool of network addresses that are to receive a particular measure of service associated with the class of service, the pools of network addresses each comprising one or more ranges of network addresses from a network address space allocated to the network.

23. The network of claim 22, wherein the network address is an IP address.

* * * * *